United States Patent
Tseng

(10) Patent No.: US 9,953,089 B2
(45) Date of Patent: *Apr. 24, 2018

(54) COEFFICIENTS ATTRIBUTION FOR DIFFERENT OBJECTS BASED ON NATURAL LANGUAGE PROCESSING

(71) Applicant: Facebook, Inc., Menlo Park, CA (US)

(72) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/366,510

(22) Filed: Dec. 1, 2016

(65) Prior Publication Data

US 2017/0083627 A1 Mar. 23, 2017

Related U.S. Application Data

(63) Continuation of application No. 13/209,207, filed on Aug. 12, 2011, now Pat. No. 9,530,167.

(51) Int. Cl.
| | | |
|---|---|---|
| *G06F 17/00* | (2006.01) | |
| *G06F 7/00* | (2006.01) | |
| *G06F 3/00* | (2006.01) | |
| *G06F 15/16* | (2006.01) | |
| *G06F 15/173* | (2006.01) | |
| *G06F 15/167* | (2006.01) | |
| *G06F 17/20* | (2006.01) | |
| *G06F 17/21* | (2006.01) | |

(Continued)

(52) U.S. Cl.
CPC .... *G06F 17/30867* (2013.01); *G06F 17/3089* (2013.01); *G06F 17/3097* (2013.01); *G06F 17/30994* (2013.01); *G06Q 50/01* (2013.01)

(58) Field of Classification Search
CPC ......... G06F 17/30864; G06F 17/30569; G06F 17/30958; G06F 17/30498; G06F 17/3071; G06F 9/466; G06F 21/10; G06F 17/241; G06F 17/2247; G06F 3/0482
See application file for complete search history.

(56) References Cited

U.S. PATENT DOCUMENTS

| | | | | |
|---|---|---|---|---|
| 2010/0049852 A1* | 2/2010 | Whitnah | ................ | G06Q 10/10 709/226 |
| 2011/0004692 A1* | 1/2011 | Occhino | ................ | H04L 67/16 709/228 |

(Continued)

OTHER PUBLICATIONS

Notice of Acceptance for AU Application No. 2012295528, dated Mar. 15, 2017.

(Continued)

*Primary Examiner* — Anne L Thomas-Homescu
(74) *Attorney, Agent, or Firm* — Baker Botts L.L.P.

(57) ABSTRACT

In one embodiment, a method includes receiving free-form text from users of an online social network, wherein the free-form text of each input corresponds to an object associated with the online social network; determining a plurality of affinity declarations from the free-form text that are associated with the object; determining, for each affinity declaration, an affinity coefficient between a respective user and the object; and upon determining that the affinity coefficient for a threshold number of users exceeds a threshold value, creating a page associated with the object for display on the online social network.

20 Claims, 5 Drawing Sheets

(51) Int. Cl.
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)
*G06F 17/30* (2006.01)
*G06Q 50/00* (2012.01)

(56) References Cited

U.S. PATENT DOCUMENTS

2012/0278064 A1* 11/2012 Leary .................. G06F 17/274
  704/9
2013/0018896 A1* 1/2013 Fleischman ............ G06Q 50/01
  707/748

OTHER PUBLICATIONS

Notice of Allowance for KR Application No. 10-2014-7006439 (with English translation), dated Mar. 20, 2017.

* cited by examiner

COEFFICIENTS ATTRIBUTION FOR DIFFERENT OBJECTS BASED ON NATURAL LANGUAGE PROCESSING

PRIORITY

This application is a continuation under 35 U.S.C. § 120 of U.S. patent application Ser. No. 13/209,207, filed 12 Aug. 2011.

TECHNICAL FIELD

The present disclosure relates generally to social networking, and more particularly, applying natural-language processing to users' free-form text declarations to identify specific objects and users' affinities towards those objects

BACKGROUND

Computer users are able to access and share vast amounts of information through various local and wide area computer networks including proprietary networks as well as public networks such as the Internet. Typically, a web browser installed on a user's computing device facilitates access to and interaction with information located at various network servers identified by, for example, associated uniform resource locators (URLs). Conventional approaches to enable sharing of user-generated content include various information sharing technologies or platforms such as social networking websites. Such websites may include, be linked with, or provide a platform for applications enabling users to view "profile" pages created or customized by other users where visibility and interaction with such profiles by other users is governed by some characteristic set of rules. By way of example, a user profile may include such user-declared information as contact information, background information, job/career information, as well as interests.

A traditional social network is a social structure made of individuals, groups, entities, or organizations generally referred to as "nodes," which are tied (connected) by one or more specific types of interdependency. Social network (graph) analysis views social relationships in terms of network theory consisting of nodes and edges. Nodes are the individual actors within the networks, and edges are the relationships between the actors. The resulting graph-based structures are often very complex. There can be many kinds of edges between nodes. In its simplest form, a social network, or social graph, is a map of all of the relevant edges between all the nodes being studied.

Users may interact with other non-user nodes and explicitly express an affinity for the node through various actions. However, a significant portion of user actions on social networks occurs without any express identification of a non-user node nor any express statement of affinity. Application of natural-language processing allows the social network to quantify this massive amount of untapped information and leverage it to enhance the social networking experience for users and advertisers.

DESCRIPTION OF EXAMPLE EMBODIMENTS

Figure 1:
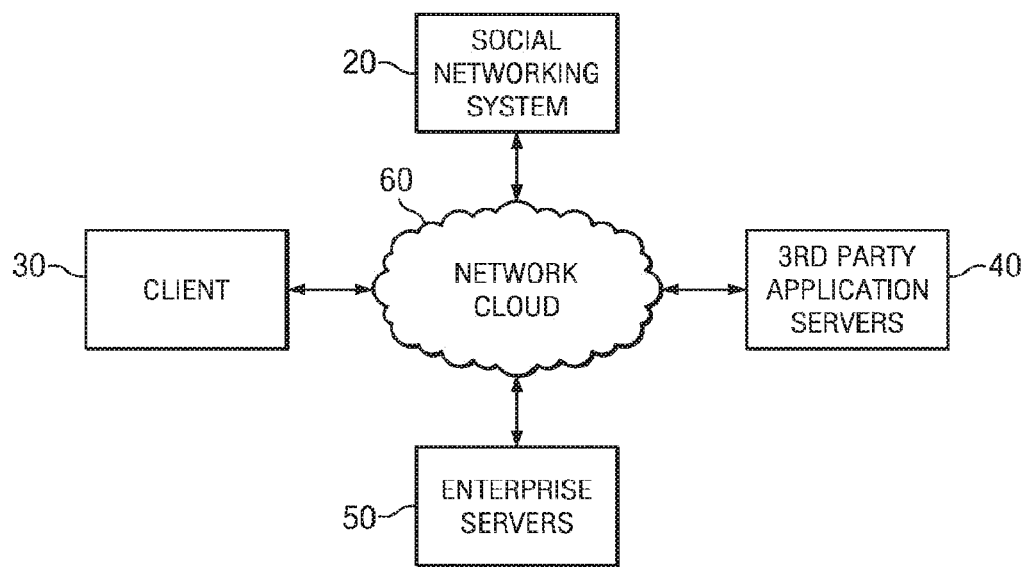
FIG. 1 illustrates an example computer network environment of an example social network environment.

Particular embodiments relate to a social network environment that includes an infrastructure or platform (hereinafter infrastructure and platform may be used interchangeably) enabling an integrated social network environment. In the present disclosure, the social network environment may be described in terms of a social graph including social graph information. In particular embodiments, one or more computing systems of the social network environment implementing the social network environment include, store, or have access to a data structure that includes social graph information for use in implementing the social network environment described herein. The social network utilizes a social graph that includes nodes representing users and concepts in the social network environment as well as edges that define or represent connections between such nodes. Application of natural-language processing allows the social networking system to logically assign affinity edges between user nodes and concept nodes from free-form text lacking or in conjunction with any explicit object identifier.

In particular embodiments, the social graph information includes a first set of user nodes that each correspond to a respective user, and a second set of concept nodes that each correspond to a respective concept. As used herein, a "user" may be an individual (human user), an entity (e.g., an enterprise, business, or third party application), or a group (e.g., of individuals or entities) that interacts or communicates with or over such a social network environment. As used herein, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a third party application, a celebrity, a person who is not a registered user, etc. In particular embodiments, each node has, represents, or is represented by, a corresponding web page ("profile page") hosted or accessible in the social network environment.

By way of example, a user node may have a corresponding user profile page in which the corresponding user can add content, make declarations, and otherwise express him or herself, while a concept node may have a corresponding concept profile page ("hub") in which a plurality of users can add content, make declarations, and express themselves, particularly in relation to the concept. In particular embodiments, the social graph information further includes a plurality of edges that each define or represent a connection between a corresponding pair of nodes in the social graph.

In particular embodiments, the social graph contains sub-categories of concept nodes. First, attribute nodes are concept nodes that are connected to user nodes or other concept nodes that do not necessarily have a corresponding hub page, and are not necessarily visible to users of the social network. For example, the social network may infer that, based on a particular user's edge connections to sports games, that the user has an affinity for "sports" or "action games." These attribute nodes are dynamically generated by the social network, and generally the hub page for such a broad category would be nonsensical or provide little or no use to users of the social network.

Similarly, if a user expresses an affinity to such a narrow concept that it would not make sense for the concept to have a hub page, the affinity is tracked on the social graph as an attribute node, but not publicly visible to users. For example, if a user checks-in at a particular restaurant with a hub page and also expresses an affinity for a particular dish at the restaurant (e.g., "the foie gras at Restaurant X is amazing."), the social network may use natural-language programming to determine an affinity, such as a "like" for an attribute node (foie gras at Restaurant X). In particular embodiments, when the number of connections to an attribute node exceeds a predetermined number, the social network dynamically creates a hub page for the attribute node. In particular embodiments, the social network will message the administrator of the concept node associated with the attribute node (in this example, the administrator of Restaurant X), and query whether he or she would like a subpage created for the attribute node. Hidden attribute nodes, as described above, may correspond to generic concepts such as "action games" and "conservative", or objects, such as "foie gras" or "steak." This distinction blurs depending on the scope of the attribute, for example, an attribute node may correspond to "action games from publisher X." As used in this disclosure, the term "attribute node" and "object node" is used interchangeably.

In some embodiments, each edge may be one of a plurality of edge types based at least in part on the types of nodes that the edge connects in the social graph. By way of example, in one particular embodiment, each edge from a first edge type defines a connection between a pair of user nodes from the first set, while each edge from a second edge type defines a connection between a user node from the first set and a concept node from the second set. Furthermore, each edge from a third edge type may define a connection between a pair of concept nodes from the second set. In such embodiments, the edge itself may store, or be stored with, data that defines a type of connection between the pair of nodes the edge connects, such as, for example, data describing the types of the nodes the edge connects (e.g., user or concept), access privileges of an administrator of one of the pair of nodes connected by the edge with respect to the other node the edge connects to (e.g., read or write access of an administrator of one node with respect to the other node connected by the edge), or data describing how or why the edge was first initialized or created (e.g., in response to an explicit user action or declaration, or automatically without an explicit user action), the strength of the connection as determined by various factors or criteria related to or shared by the nodes connected by the edge, among other suitable or relevant data. In an alternate embodiment, each edge may simply define or represent a connection between nodes regardless of the types of nodes the edge connects; that is, the edge itself may store, or be stored with, identifiers of the nodes the edge connects but may not store, or be stored with, data that describes a type of connection between the pair of nodes the edge connects. Furthermore, in any of these or other embodiments, data that may indicate the type of connection or relationship between nodes connected by an edge may be stored with the nodes themselves.

In particular embodiments, a concept database includes an index of known concepts as well as, in some embodiments, various attributes, metadata, or other information associated with the respective concepts. In particular embodiments, one or more backend (server-side) processes crawl one or more external data sources (e.g., WIKIPEDIA (www.wikipedia.org), FREEBASE (www.freebase.com, available from METAWEB), or the internet in general) to facilitate or aid in generating or populating the concept database. In some embodiments, the concept database may also be augmented with information extracted from users of the social network environment described herein.

Users of the social networking system may interact with concept nodes and their hubs in various ways. For example, a user may click a button on the hub explicitly stating that the user "likes" the hub and associated concept node. In particular embodiments, a user may "check-in" to a real-world location that is associated with a hub page. In particular embodiments, users may become a "fan" of a particular hub and associated concept node. In particular embodiments, the user may explicitly identify a hub page and post a comment or a review on the hub page. These interactions may occur on or off the social network, but include at least an explicit identification of the hub page, and an explicit affinity towards the concept node associated with the hub. However, the vast majority of actions on the social network do not include either an identification of the hub or an expressly stated affinity.

Users of the social network may take actions that primarily involve typing free-form text. In particular embodiments, users may type free-form text as a "status message." In particular embodiments, users may enter free-form text onto their own wall, another users' wall, or a hub page's wall in the form of a comment. In particular embodiments, users may comment on any element of any other page on the social networking web site, such as a photo album, an individual photo or video, a posted link, or the like. In particular embodiments, users of the social networking site may send each other private messages in the form of email, text messages, or instant messages. In particular embodiments, a user may append free form text to another user action that includes an explicit object/hub identifier or expression of affinity. For example, a user may check-in to a location and, in conjunction with his or her check-in, append free-form text such as, "Enjoying the weather and mango margaritas." In particular embodiments, a user may post free-form text on an element of the social networking system that implicitly identifies a hub or object. For example, a user may comment on a link shared by his friend to a news article to the New York Times; although the user's comment includes no explicit identification of the New York Times article, its placement in relation to a link sharing the article indicates an implicit object or hub identifier.

In particular embodiments, an application on the social networking system parses all the free-form text posted by users, and through natural language processing, identifies one or more objects and one or more affinities for the affinity that may be stored in the social graph to be leveraged by the social networking system or its advertisers.

Various portions of such a social networking platform may be implemented via a hardware architecture or software framework that enables various software components or processes to implement particular embodiments, as is described in more detail, by way of example and not by way of limitation, below. The platform may include one or more hardware or software components, one or more of which may be located or embodied in one or more consolidated or distributed computing systems. Additionally, as used herein, "or" may imply "and" as well as "or;" that is, "or" does not necessarily preclude "and," unless explicitly stated or implicitly implied.

As just described, in various example embodiments, one or more described web pages or web applications are associated with a social network environment or social networking service. As used herein, a "user" may be an individual (human user), an entity (e.g., an enterprise, business, or third party application), or a group (e.g., of individuals or entities) that interacts or communicates with or over such a social network environment. As used herein, a "registered user" refers to a user that has officially registered within the social network environment (Generally, the users and user nodes described herein refer to registered users only, although this is not necessarily a requirement in other embodiments; that is, in other embodiments, the users and user nodes described herein may refer to users that have not registered with the social network environment described herein). In particular embodiments, a registered user has a corresponding "profile" page stored or hosted by the social network environment and viewable by all or a selected subset of other users. Generally, a user has administrative rights to all or a portion of his or her own respective profile page as well as, potentially, to other pages created by or for the particular user including, for example, home pages, pages hosting web applications, among other possibilities. As used herein, an "authenticated user" refers to a user who has been authenticated by the social network environment as being the user claimed in a corresponding profile page to which the user has administrative rights or, alternately, a suitable trusted representative of the claimed user.

As used herein, a "connection" may represent a defined relationship between users or concepts of the social network environment, which can be defined logically in a suitable data structure of the social network environment and can be used to define a relationship (hereinafter referred to as an edge) between the nodes corresponding to the users or concepts of the social network environment for which the connection has been made. As used herein, a "friendship" represents a connection, such as a defined social relationship, between a pair of users of the social network environment. A "friend," as used herein, may refer to any user of the social network environment with which another user has formed a connection, friendship, association, or relationship with, causing an edge to be generated between the two users. By way of example, two registered users may become friends with one another explicitly such as, for example, by one of the two users selecting the other for friendship as a result of transmitting, or causing to be transmitted, a friendship request to the other user, who may then accept or deny the request. Alternately, friendships or other connections may be automatically established. Such a social friendship may be visible to other users, especially those who themselves are friends with one or both of the registered users. A friend of a registered user may also have increased access privileges to content, especially user-generated or declared content, on the registered user's profile or other page. It should be noted, however, that two users who have a friend connection established between them in the social graph may not necessarily be friends (in the conventional sense) in real life (outside the social networking environment). For example, in some implementations, a user may be a business or other non-human entity, and thus, incapable of being a friend with a human being user in the traditional sense of the word.

As used herein, a "fan" may refer to a user that is a supporter of a particular web page, web application, or other web content accessible in the social network environment. In particular embodiments, when a user is a fan of a particular web page ("fans" the particular web page), the user may be listed on that page as a fan for other registered users or the public in general to see. Additionally, an avatar or profile picture of the user may be shown on the page (or in/on any of the pages described below). As used herein, a "like" may refer to something, such as, by way of example and not by way of limitation, an interest, a link, a piece of media (e.g., photo, photo album, video, song, etc.) a concept, an entity, or a page, that a user, and particularly a registered or authenticated user, has declared or otherwise demonstrated that he or she likes, is a fan of (as used herein in various example embodiments, to "like" or to "fan" something, such as a concept or concept profile page, may be defined equivalently in the social networking environment and may be used interchangeably; similarly, to declare oneself a "fan" of something, such as a concept or concept profile page, or to declare that oneself "likes" the thing, may be defined equivalently in the social networking environment and used interchangeably herein), supports, enjoys, or otherwise has a positive view of. As used herein, an "interest" may refer to a user-declared interest, such as a user-declared interest presented in the user's profile page. As used herein, a "want" may refer to virtually anything that a user wants. As described above, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a celebrity, a person who is not a registered user, or even, in some embodiments, another user (e.g., a non-authenticated user), etc. By way of example, there may be a concept node and concept profile page for "Jerry Rice," the famed professional football player, created and administered by one or more of a plurality of users (e.g., other than Jerry Rice), while the social graph additionally includes a user node and user profile page for Jerry Rice created by and administered by Jerry Rice, himself In particular embodiments, as will be described in more detail below, a friend connection or friendship may define or indicate a logical connection defined or represented by an edge between user nodes in the social graph, while a like, want, fan, or other connection demonstrating, generally, an interest or association may define a logical connection or edge between a user node and a concept node in the social graph (and in some embodiments, between two user nodes, or between two concept nodes). Other edge types can correspond to particular actions a user has undertaken relative to an object, such as a song or movie. For example, additional edge types may include edge types corresponding to purchasing content or objects, viewing or listening to content, sharing content, bookmarking content, and the like.

Particular embodiments may operate in, or in conjunction with, a wide area network environment, such as the Internet, including multiple network addressable systems. FIG. 1 illustrates an example network environment, in which various example embodiments may operate. Network cloud 60 generally represents one or more interconnected networks, over which various systems and hosts described herein may communicate. Network cloud 60 may include packet-based wide area networks (such as the Internet), private networks, wireless networks, satellite networks, cellular networks, paging networks, and the like. As FIG. 1 illustrates, particular embodiments may operate in conjunction with a network environment comprising social network environment 20 and client devices 30, as well as, in some embodiments, one or more third party web application servers 40 or one or more enterprise servers 50. Client devices 30, web application servers 40, and enterprise servers 50 may be operably connected to the network environment and network cloud 60 via a network service provider, a wireless carrier, a set of routers or networking switches, or any other suitable means.

Each client device 30, web application server 40, or enterprise server 50 may generally be a computer, computing system, or computing device (such as that described below with reference to FIG. 8) including functionality for communicating (e.g., remotely) over a computer network. Client device 30 in particular may be a desktop computer, laptop computer, personal digital assistant (PDA), in- or out-of-car navigation system, smart phone or other cellular or mobile device, or mobile gaming device, among other suitable computing devices. Client device 30 may execute one or more client applications, such as a web browser (e.g., MICROSOFT WINDOWS INTERNET EXPLORER, MOZILLA FIREFOX, APPLE SAFARI, GOOGLE CHROME, AND OPERA, etc.), as illustrated in FIG. 2B, to access and view content over a computer network 60. In particular implementations, the client applications allow a user of client device 30 to enter addresses of specific network resources to be retrieved, such as resources hosted by social network environment 20, web application servers 40, or enterprise servers 50. These addresses can be Uniform Resource Locators (URLs). In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

More particularly, when a user at a client device 30 desires to view a particular web page (hereinafter also referred to as a target structured document) hosted by social network environment 20, or a web application hosted by a web application server 40 and made available in conjunction with social network environment 20, the user's web browser, or other client-side structured document rendering engine or suitable client application, formulates and transmits a request to social network environment 20. The request generally includes a URL or other document identifier as well as metadata or other information. By way of example, the request may include information identifying the user, such as a user ID, as well as information identifying or characterizing the web browser or operating system running on the user's client computing device 30. The request may also include location information identifying a geographic location of the user's client device or a logical network location of the user's client device, as well as timestamp identifying when the request was transmitted.

In an example implementation, when a request for a web page or structured document hosted by social network environment 20 is received by the social network environment 20, one or more page-generating processes executing within the social network environment 20 typically generate a base web page in the form of a Hyper Text Markup Language (HTML), Extensible Markup Language (XML), or other web browser-supported structured document. The generated structured document is then transmitted in a response, which may comprise one or more portions or partial responses, to the requesting client 30 via a Hypertext Transfer Protocol (HTTP) or other suitable connection for rendering by the web browser at the client device 30. The structured document may include one or more resources (e.g. JavaScript scripts, code segments, or resources, Cascading Style Sheet (CSS) code segments or resources, image data or resources, video data or resources, etc.), or references to such resources, embedded within the transmitted document. By way of example, a resource embedded in an HTML document may generally be included or specified within a script element, image element, or object element, among others, depending on the type of resource. The element referencing or specifying the resource may include a source attribute (e.g., src) identifying a location of the resource, which may be within a server or data store within social network environment 20 or at one or more external locations, to the client device 30 requesting the web page. Typically, upon receipt of the response, the web browser or other client document rendering application running at the client device 30 then constructs a document object model (DOM) representation of the received structured document and requests the resource(s) (which may be at one or more other external locations) embedded in the document.

In an example implementation, when a registered user of social network environment 20 first requests a web page from social network environment 20 in a given user session, the response transmitted to the user's client device 30 from social network environment 20 may include a structured document generated by the page-generating process for rendering a login page at the client device. The user may then enter his or her user login credentials (e.g., user ID and password), which are then transmitted from the user's client device 30 to social network environment 20. Upon successful authentication of the user, social network environment 20 may then transmit a response to the user's web browser at the user's client device 30 that includes a structured document generated by the page-generating process for rendering a user homepage or user profile page at the user's client device.

Figure 2:
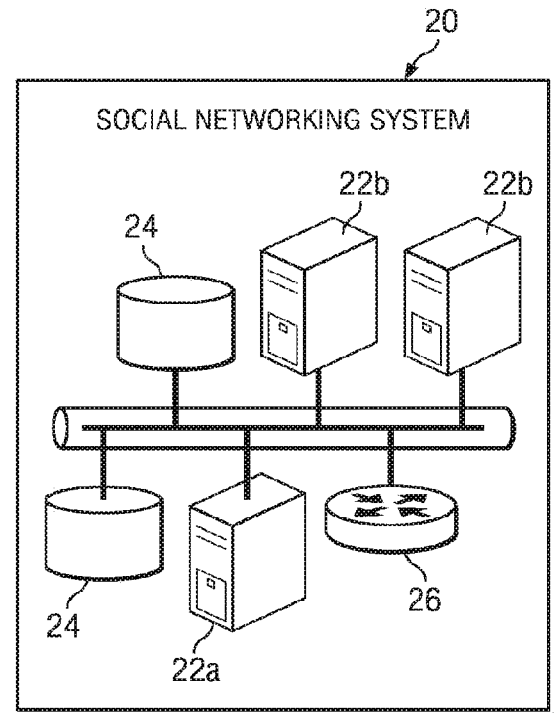
FIG. 2 illustrates example components of an example social network environment.

In one example embodiment, social network environment 20 comprises computing systems that allow users at client devices 30 to communicate or otherwise interact with each other and access content, such as user profiles, as described herein. Social network environment 20 is a network addressable system that, in various example embodiments, comprises one or more physical servers 22a or 22b (hereinafter also referred to collectively as servers 22) as well as one or more data stores collectively referred to herein as data store 24 (which may be implemented in or by one or more of a variety of consolidated or distributed computing systems, databases, or data servers), as illustrated in FIG. 2. The one or more physical servers 22 are operably connected to computer network 60 via, by way of example, a set of routers or networking switches 26. In an example embodiment, the functionality hosted by the one or more physical servers 22 may include web or HTTP servers, FTP servers, as well as, without limitation, web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), and the like.

Physical servers 22 may host functionality directed to the operations of social network environment 20. By way of example, social network environment 20 may host a website that allows one or more users, at one or more client devices 30, to view and post information, as well as communicate with one another via the website. Hereinafter, servers 22 may be referred to as server 22, although, as just described, server 22 may include numerous servers hosting, for example, social network environment 20, as well as other content distribution servers, data stores, or databases. Data store 24 may store content and data relating to, and enabling, operation of the social network environment as digital data objects including content objects. A data object, in a particular implementation, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 24 corresponds to one or more of a variety of separate or integrated databases, such as relational databases and object-oriented databases, that maintain information as an integrated collection of logically related records or files stored on one or more physical systems. Structurally, data store 24 may generally include one or more of a large class of data storage and management systems. In particular embodiments, data store 24 may be implemented by any suitable physical system(s) including components, such as one or more database servers, mass storage media, media library systems, storage area networks, data storage clouds, and the like. In one example embodiment, data store 24 includes one or more servers, databases (e.g., My SQL), and/or data warehouses.

Data store 24 may include data associated with different social network environment 20 users, client devices 30, web application servers 40, or enterprise servers 50, as well as, in particular embodiments, data associated with various concepts. As described above, particular embodiments relate to a social network environment 20 that includes a platform enabling an integrated social network environment. In the following example embodiments, the social network environment may be described or implemented in terms of a social graph including social graph information. In particular embodiments, data store 24 includes a the social graph database in which the social graph information for use in implementing the social network environment described herein is stored. In particular embodiments, the social graph information stored by social network environment 20 in data store 24, and particularly in the social graph database, includes a plurality of nodes and a plurality of edges that define connections between corresponding nodes. In particular embodiments, the nodes or edges themselves are data objects that include the identifiers, attributes, and information (including the information for their corresponding profile pages) for their corresponding users or concepts (as described below), some of which is actually rendered on corresponding profile or other pages. The nodes may also include pointers or references to other objects, data structures, or resources for use in rendering content in conjunction with the rendering of the profile pages corresponding to the respective nodes.

Figure 3:
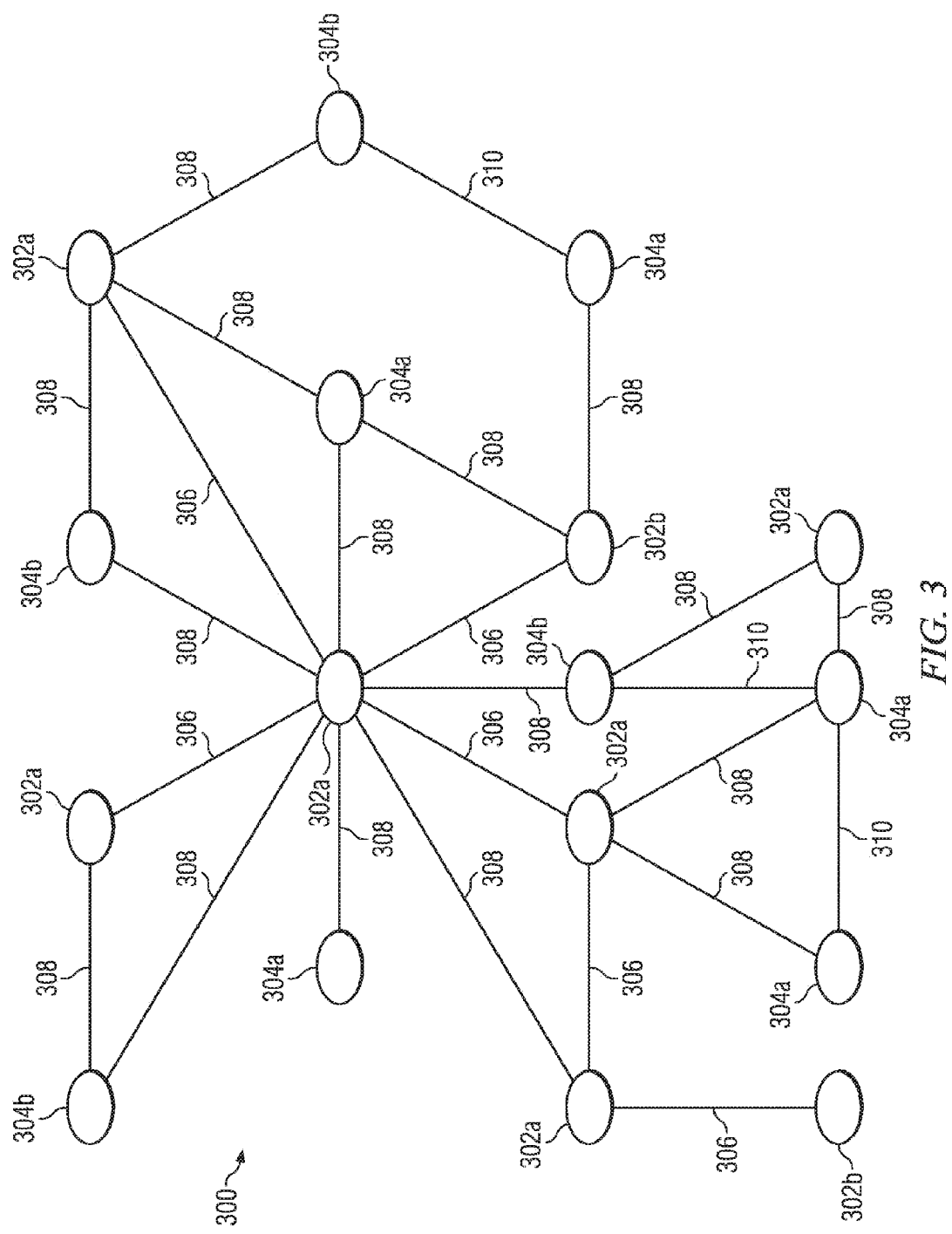
FIG. 3 illustrates an example social graph.

FIG. 3 illustrates an example social graph 300 shown, for didactic purposes, in a two-dimensional visual map representation. In particular embodiments, the plurality of nodes and edges of social graph 300 are stored as data objects in data store 24, and particularly a social graph database. Additionally, as will be described later, data store 24 may further include one or more searchable or queryable indexes of nodes or edges generated by indexing the social graph database. In particular embodiments, the plurality of nodes includes a first set of administered nodes 302 and a second set of un-administered nodes 304. In particular embodiments, the first set of administered nodes 302 are user-administered nodes (hereinafter also referred to as "user nodes") that each correspond to a respective user and a respective user profile page of that user. In particular embodiments, user profile pages corresponding to user nodes 304 may be modified, written to, or otherwise administered by, and only by, their respective owner (registered) users (unless an official administrator of social network environment 20 in general desires or requires access to modify or delete a user's profile page, e.g., as a result of scrupulous or otherwise inappropriate action on the part of the registered user). In one particular embodiment, the first set of user nodes 302 includes a first subset of authenticated nodes 302a and a second subset of un-authenticated nodes 302b. In a particular embodiment, the first subset of authenticated nodes 302a correspond to respective registered authenticated users while the second subset of un-authenticated nodes 302b correspond to registered users who have not been authenticated by social network environment. For example, an authenticated user may be a user who has been verified to be who they claim to be in his or her respective profile page while an un-authenticated user may be a user who has not been verified to be who they claim to be in his or her respective profile page (e.g., an un-authenticated user may register a profile page in President Barack Obama's name, although the un-authenticated user is not President Obama). In some embodiments, for some existing user profile pages, social network environment 20 may determine whether the administrator of the user profile page is truly the authentic voice of the claimed user (real person the user claims to be). If it is determined that the current administrator is not the authentic or true claimed user, social network environment 20 may remove the user's administrative rights to the page. In this way, the user node and corresponding user profile page may be redefined in the social graph information stored in the social graph database as a concept node 304 and corresponding concept profile page. It should further be noted that, in various example embodiments, user nodes 302a and 302b may or may not be classified distinctly as different node types; that is, in one embodiment, a user node 302 may be identified as an authenticated user node or an un-authenticated user node based on the data stored with or within the data object corresponding to the node rather than by an explicit user node type or sub-type.

Figure 4A:
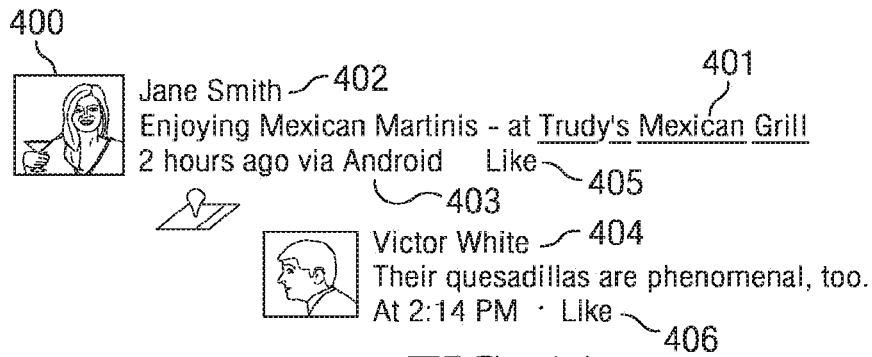
FIGS. 4A-4C each illustrate an example user actions including free-form text.
Figure 4B:
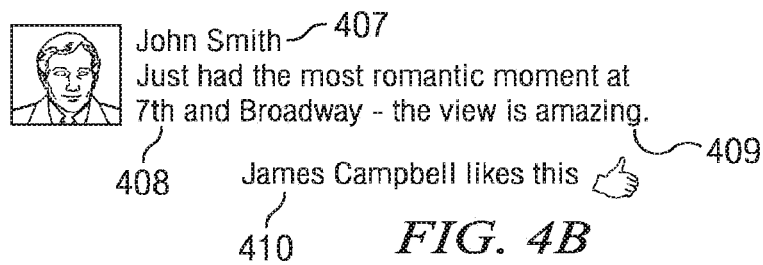
Figure 4C:
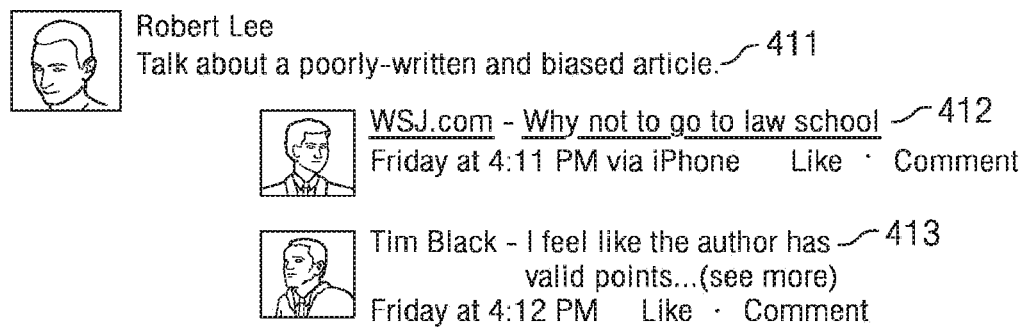

FIGS. 4A-4C illustrate, for didactic purposes, example user actions on the social network that may include fee form text. FIG. 4A illustrates a "check-in" 400 including context data, as well as free-form text. In particular embodiments, the check-in appears on both the page of the generating user, in this example, "Jane Smith", as well as all of Jane Smith's friends on the social network. The check-in includes several pieces of context information, including location 401. Location 401, "Trudy's Mexican Grill", is selected from a list of locations that the user is presented with when she hits the check-in button on a computing device. In particular embodiments, each particular location may have a corresponding hub page on the social network. The check-in also includes other context data, such as the time of check in 403. Finally, the check-in may optionally include free-form text 402. In this case, free-form text 402, "Enjoying Mexican Martinis" includes an expression of affinity by Jane Smith to the Mexican Martinis at Trudy's Mexican Grill. Typically, this information is not accounted for in social networks, and a vast wealth of user information is lost.

In particular embodiments, a friend of the user generating the check-in may comment on the check-in, as illustrated by comment 404. Comment 404 may also include context data, such as the time of the comment; however, comment 404 does not include any explicit identification information such as location 401. However, implicit location information may be inferred from comment 404. For example, if the element that is commented on, in this case check-in 400, includes an explicit location, the social networking system may assume that the comment is related to the location, in this example "Trudy's Mexican Grill" 401. Because a comment on an element directly associated with a location is likely to be related to the location, the social networking system infers a location identifier as context data for comment 404. In particular embodiments, friends of the user generating the check-in may also "like" the check-in through button 405, or may "like" the comment itself through button 406. In particular embodiments, the social networking system automatically records an affinity for check-in location 401 when users "like" check-in 400.

FIG. 4B illustrates a typical free-form text status message or comment that includes no explicit location identifier. Although the comment "Just had the most romantic moment at 7th and Broadway—the view is amazing!" includes text that identifies a particular location, typical social networks do not recognize this as anything but free-form text. The only context data associated with the comment is the time it was posted. The application of the method of FIG. 6 may generate both locations and an affinity for the location that may be stored with the user in a profile database.

FIG. 4C illustrates a shared link that includes user-generated free-form text commentary. A user may share a link to an article, web page, product, or any other resource accessible via a universal resource locator (URL). The user action includes both free-form text commentary 411, as well as context data in the form of a link to the article 412 and the time of posting. In particular embodiments, the generating user's friends may also post a comment on the article 413.

The user actions depicted in FIGS. 4A-4C may be displayed on a user profile page of a user corresponding to a user node 302. In particular embodiments, a user profile page is visible to the user, the user's friends, and even other non-friend users depending on privacy settings, which may be set or modified by the user via the user's profile page or a user homepage, for example. In particular embodiments, the user profile page includes a Wall (feed) tab for accessing a wall (feed) for postings (described below).

In particular embodiments, a user profile page also includes a friends section that displays all or a subset of the user's friends as defined by edges in the social graph stored in a social graph database. In particular embodiments, any action that a user takes with respect to another second user, whether or not the second user may be a friend of the user or not, and, in particular embodiments, actions that the user takes with respect to various concept nodes, may be displayed in a recent activity section, which may be viewable as a sub-section within a wall (feed) section under Wall (feed) tab. Generally, wall (feed) section is a space on every user's profile page that allows the user and friends to post messages via an input box for the user and friends to see, as well as to comment or otherwise express themselves in relation to posts on the wall (feed).

In particular embodiments, the second set of un-administered nodes 304 are non-administered nodes that each correspond to a respective concept and a respective concept profile page (also referred to hereinafter as a "hub") devoted to the respective concept. In particular embodiments, un-administered nodes (also referred to as "concept nodes" or "hub nodes") 304 are nodes having respective concept profile pages (hubs) that are generally not administered by any one user; rather, in particular embodiments, hubs may generally be administered, created, and written and contributed to or modified by, at least in part, by any registered user of social network environment 20, including, in particular embodiments, users not having connections with the hub nodes 304 (that is, users whose user nodes 302 are not necessarily connected with the hub nodes 304 with edges in the social graph in social graph database). In a sense, hubs may be administered, or contributed to, by the community of registered users of social network environment 20. In particular embodiments, the second set of hub nodes 304 includes a first subset of un-administered nodes 304*a* that each correspond to a non-generic hub and a second subset of un-administered nodes 304*b* that each correspond to a generic hub. By way of example, a generic hub may be a hub devoted to an abstract activity such as running while a non-generic hub may be a hub devoted to a more specific concept, such as a profile page devoted to a particular club of runners. It should further be noted that, in various example embodiments, nodes 304*a* and 304*b* may or may not be classified distinctly as different node types; that is, in one embodiment, a hub node 304 may be identified as a generic hub node or a non-generic hub node based on the data stored with or within the data object corresponding to the hub node rather than by an explicit hub node type or sub-type.

Figure 5:
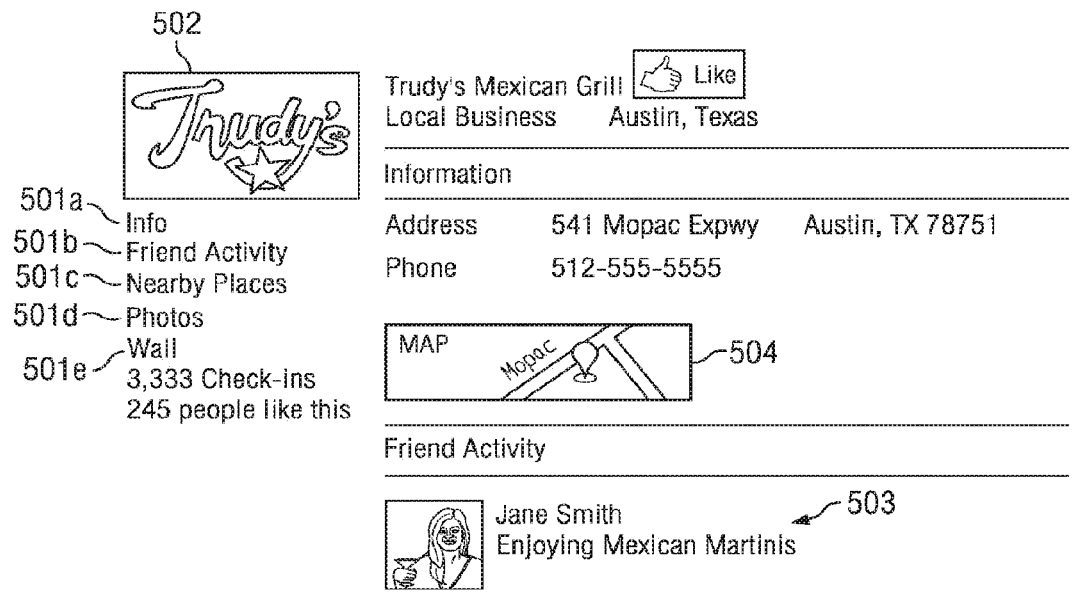
FIG. 5 illustrates an example concept profile page.

Similar to user profile pages, concept profile pages ("hubs") share information related to the concept associated with the corresponding hub node 304. In particular embodiments, any registered user logged in to social network environment 20 and viewing a hub may add content to the hub similar to a wiki-site. In particular embodiments, hub node 304 may represent a business, and only the node administrator may add content or modify the hub. FIG. 5 illustrates an example hub for the restaurant, "Trudy's Mexican Grill" In an example embodiment, and as illustrated in FIG. 5, a hub may include sub-pages accessible via an info tab 501*a*, Friend Activity tab 501*b*, a nearby places tab 501, photos tab 501*d*, and a wall (feed) tab 501*e* similar to a user profile page. A hub may also include a photo or picture section under photos tab 501*d* allowing users to upload images in or related to the concept, one of which may be selected as a profile picture 502 for the hub.

In particular embodiments, wall (or news feed/activities feed) section 501*e*, or other feed or activities section of the hub, displays comments, status updates, wall posts and other user activities associated with the user and friends of the user that are viewing the hub. The wall (or news feed/activities feed) section 501*e*, or other feed or activities section of the hub may also display comments, status updates, wall posts and other user activities and user generated content that are related to the concept for which the hub was created. More particularly, one or more processes within social networking environment 20 may perform a search on comments, status updates, wall posts and other user-generated content and user activities associated with the requesting user and friends of the requesting user filtered by concept; that is, a keyword search for keywords related to the concept of the currently requested or viewed hub (and potentially keywords related to the concepts associated with the recommended hubs) in these streams of user feeds or activities related to the requesting user and the requesting user's friends, and display this subset of user content or activities in the wall or feed section 501*e* of the currently requested or viewed hub. By way of example, U.S. patent application Ser. No. 12/704,400, filed 11 Feb. 2010, and titled REAL TIME CONTENT SEARCHING IN SOCIAL NETWORK, describes methods, processes, or systems for performing such searching, filtering, and displaying, and is hereby incorporated by reference herein. Wall or feed section 501e may also include a section, which may be a separate section from that just described, that displays comments, status updates, wall posts and other user activities of any and all users of social networking environment 20 that are related to the concept for which the hub was created, not just those of the user and friends of the user viewing the hub.

In particular embodiments, the default sections displayed in a particular hub upon creation of the hub may depend on the concept itself; that is, hub nodes 304 may be categorized by social network environment 20, and these categories (e.g., people, places, things, activities, sports, sports teams, celebrities, cities, locations, movies, actors, books, restaurants, etc.) may dictate, at least in part, which sections are displayed on a particular hub. By way of example, place hub may include a Nearby Places tab 501c that displays other businesses or locations in the same geographic region and a map 504 of the business location. A place hub may also include, in particular embodiments, a friend activity tab 501b, that shows all the activity of the user that is viewing the hub page's friends. For example, the check-in 400 from FIG. 4A would be displayed as a friend activity 503 if the user viewing the place page is a friend of the user generating the check-in, in this example, "Jane Smith."

In particular embodiments, hub nodes 304 and their respective hubs may be explicitly created by users of social network environment 20 or generated automatically based on various criteria. In particular embodiments, hubs and their respective hub nodes 304 may be of two varieties such as, for example, whether or not they are considered or classified as generic or non-generic. In one particular implementation, hubs and their respective hub nodes 304 may be "locked" or "un-locked." Hubs may be locked at the time of creation, or other suitable time, by, for example, the creator or an administrator of social network environment 20. As described above, hubs are essentially community owned, and hence, in particular embodiments, any user of social network environment 20 may edit (e.g., add content or declarations to) hubs. However, in particular embodiments, edits in un-locked hubs may "go live" (become visible to the user or other users viewing the hub) immediately while edits in locked hubs may require approval by trusted users or administrators before being modified and presented publicly to users. Additionally, it should be noted that, in some embodiments, social network environment 20 may track which users added which content to hubs as well as when these users added the respective content.

It should also be noted that, in particular embodiments, social network environment 20 provides means or processes (e.g., selectable links or user interfaces) for the true voices of hubs corresponding to hub nodes 304 (or un-authenticated user profile pages corresponding to un-authenticated user nodes 302b), such as the actual celebrity or business for which a hub node 304 has previously been created, to claim these nodes thereby assuming administrative rights over them and redefining them in the social graph as, for example, registered authenticated user nodes 302a (or, alternately, as authenticated hub nodes 304).

As illustrated in FIG. 3, user nodes 302 and hub nodes 304 stored in the social graph database may be connected with one another via edges. As described above, in some embodiments, each edge may be classified or characterized by an edge type of a plurality of edge types that define, indicate, or characterize the connection between the pair of nodes connected by the edge. By way of example, user nodes 302 may be connected with one another via edges 306 of a first edge type. In particular embodiments, edges 306 define friendship or other social relationship connections between users (e.g., friends) associated with the respective user nodes 302. Additionally, user nodes 302 may be connected with concept nodes 304 via edges 308 of one or more second edge types. By way of example, a user corresponding to a user node 302 may make a declaration or otherwise indicate that he or she likes, is a fan of, wants, or otherwise has an interest in or association with a concept corresponding to a particular hub node 304. As discussed above, other edge types may be based on user interactions with concepts or digital objects related to a hub node, such as playing and/or sharing a song. The user may indicate this like or interest via clicking a link on the corresponding concept node's hub or by other suitable means, such as for example, clicking a link in the user's home or profile page in response to an invitation, clicking a link in a friend's profile page, or, in particular embodiments, by some automatic or automated means.

Furthermore, in some embodiments, various hub nodes 304 may be connected with one another in the social graph database via edges 310 of a third edge type. This third edge type may define an informational or categorical relationship between hub nodes 304, some of which may tend to organize such hubs into hierarchies. By way of example, a generic hub devoted to Asian food may have a link in the page to various Asian restaurants or review pages displayed in non-generic hubs. As such, in the social graph, edges 310 may connect the generic Asian food hub to one or more other generic hubs or non-generic hubs.

Additionally, in some embodiments, each edge type may include a plurality of edge sub-types that add more detail or metadata describing the specific type of connection between corresponding pairs of nodes. Furthermore, in some embodiments, new edge types may be defined or generated automatically or dynamically. By way of example, information entered into, or in relation to, third party web applications may cause new edge types to be defined and generated. As a particular example, a web application for Netflix may result in an edge type that signifies "movies I want to see."

In such embodiments in which edges have or are assigned associated edge types, the edge itself may store, or be stored with, data that defines a type of connection between the pair of nodes the edge connects, such as, for example, data describing the types of the nodes the edge connects (e.g., user, hub, category or classification of hub), access privileges of an administrator of one of the pair of nodes connected by the edge with respect to the other node the edge connects to (e.g., read or write access of an administrator of one node with respect to the other node connected by the edge), or data describing how or why the edge was first initialized or created (e.g., in response to an explicit user action or declaration, or automatically without an explicit user action), the strength of the connection as determined by various factors or criteria related to or shared by the nodes (or more particularly the users or concepts associated with the respective connected nodes) connected by the edge, among other suitable or relevant data.

In an alternate embodiment, each edge may simply define or represent a connection between nodes regardless of the types of nodes the edge connects; that is, the edge itself may store, or be stored with, identifiers of the nodes the edge connects but may not store, or be stored with, data that describes a type of connection between the pair of nodes the edge connects. Furthermore, in any of these or other embodiments, data that may indicate the type of connection or relationship between nodes connected by an edge may be stored with the nodes themselves. In particular embodiments, the edges, as well as attributes (e.g., edge type and node identifiers corresponding to the nodes connected by the edge), metadata, or other information defining, characterizing, or related to the edges, may be stored (e.g., as data objects) in the social graph database and updated periodically or in response to various actions or factors (e.g., as a user interacts more with a hub, the edge connecting the respective user and hub nodes may be updated to reflect this interaction, which may then contribute to an affinity or connection strength score characterizing the edge as described in more detail below).

In particular embodiments, social network environment 20 may leverage information extracted from both user nodes 302 as well as hub nodes 304 for various purposes or to implement or augment various existing or new features. Additionally, as a hub node 304 is populated with information entered or contributed by various users, other hub nodes 304 and respective hubs may be generated based on such information as described below. Furthermore, hubs may provide value to users in a number of manners. By way of example, if a first user visits a particular hub, the user may discover that various ones of the user's friends are also connected to that hub. For example, in an online music store, the hub may correspond to a music artist, an album or a particular song. The first user may also easily determine what other hubs those friends are connected to. Social network environment 20 may also correlate this information about the user and the user's friends to find, for example, overlapping interests or attributes, which may then be used to generate other hubs, used to generate targeted advertisements, or to make recommendations to users, such as recommended hubs.

Figure 6:
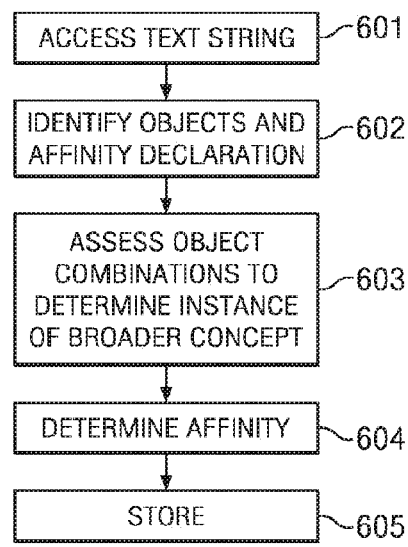
FIG. 6 shows a flowchart illustrating an example method for calculating coefficients through natural-language processing.

FIG. 6 is a flowchart illustrating an example method of determining affinity coefficients for a given user action through natural language processing. The method may be implemented via one or more applications residing on one or more servers 22 in the social networking system 20. In particular embodiments, the application resides only on a single application server 22a or 22b in the social networking system 20. In particular embodiments, the application may access an organic activity stream comprising the aggregate set of all user actions on the social networking system. In particular embodiments, the application may have both read and write access to a profile database 24.

At Step 601, the application receives a text input. The text input may be in, but is not limited to, any form previously described in FIGS. 4A-4C, such as a status update, a comment, a check-in, a posted review, an electronic message sent between users of the social network, or a shared link. This disclosure envisions multiple different actions that may be taken on the social network that involve the input of free-form text, and is not limited to the aforementioned examples. Regardless of the action that generated the free-form text, at Step 601, the application receives the action and accesses the text string included in the action. For example, upon receiving check-in 400, the application extracts the free-form text field ("Enjoying Mexican Martinis"). Similarly, with regard to status update 407, the application extracts the text "Just had the most romantic moment at 7th and Broadway—the view is amazing", and for shared link 411, the application extracts the text string, "Talk about a poorly-written and biased article."

At Step 602, the application identifies objects and affinities from both the received action and the extracted text string. The application first extracts any context data for use in detecting an object, such as explicit object identifiers. For example, check-in 400 includes an explicit identification of a hub page, "Trudy's Mexican Grill." Thus the application knows that any text-string included with the check-in is very likely to be related to the place checked-into. Similarly, shared link 412 includes an explicit object identifier—the specific Wall Street Journal article, "Why Not to go to Law School." In particular embodiments, there may not be a hub page for the article, because it is too specific to be meaningful to users of the social network. In this case, the social network may create an attribute node that is hidden from users and has no explicit hub page. Other context data that may be pulled from the user action include the time of the action and the device used to generate the action. For example, check-in 400 and shared link 412 were generated from various mobile devices, which may increase the probability that the user is mobile, and that the user action is related to a place or location.

After extracting the context data, the application attempts to identify objects and affinity indicators in the text string itself via natural-language processing. For example, in check-in 400, the term "Mexican Martinis" can be identified as a noun-adjective combination that is likely an object. Similarly, with regard to status update 407, the term "7th and Broadway" may be identified through natural-language processing as relating to a place, particularly an intersection of two streets, as well as "view" as an object at a given location. Objects may be identified by comparing each word or combination of words to a dictionary of objects that is maintained in a wiki or database. In particular embodiments, the dictionary of objects is crowd-sourced from all the objects identified by users.

The application simultaneously parses the text string for affinity indicators via natural-language processing. For example, in check-in 400, the term "enjoying" would be automatically tagged as an indicator of a positive affinity. Similarly, in status message 407, the application would automatically tag and extract the terms "most romantic" and "amazing." In particular embodiments, certain words may be tagged both as probable object identifiers as well as affinity statements. In particular embodiments, the affinity declarations may be both positive and negative. For example, in shared link 412, the text string 411 includes "poorly-written" and "biased", which would indicate a negative affinity for the identified object by the user. In particular embodiments, the natural-language processing dictionary is relative, and assigns higher or lower affinities based on the words used, for example, "love" is assigned a higher affinity than "like." In particular embodiments, natural-language processing algorithms take punctuation and font into account; for example, statements followed by one or multiple exclamation points would be weighted as a higher affinity than statements ending with a period. By way of another example, "LOVE" in all caps may be assigned a higher affinity value than "love" in lowercase. Techniques for natural-language processing are well-known in the art, and this disclosure contemplates any of such techniques for extracting an object and affinity from a free-form text string.

At Step 603, the application assesses the various object combinations to determine an instance of a broader concept. The application evaluates the various object and context data from the user action to determine the subject, or target, of the user's affinity declaration. For example, in check-in 400, the application determined in Step 602 that the user action includes an explicit place identifier ("Trudy's Mexican Grill"), at least one object ("Mexican Martinis") and a time ("2 hours ago"). Although there is likely a hub-page for "Martini's" and possibly even "Mexican Martini's", the application takes into account the combination of context data with the determined objects to calculate an instance of a broader concept. In this case, the broader concept would be "martinis" or "drinks" and the specific instance of the broad concept would be determined as "Mexican Martinis at Trudy's Mexican Grill."

In particular embodiments, the instance may be so specific that a visible hub page would be nonsensical or useless to members of the social network. Therefore, the social networking system may create a hidden attribute node (also referred to as an "object node") for "Mexican martinis at Trudy's Mexican Grill." Although the node lacks a hub page and is invisible to the users, an affinity for the user to the hidden attribute node is stored by the social network. In this fashion, it is conceivable that every single item on the menu of Trudy's Mexican Grill, and, further extrapolated, every single restaurant, could potentially have a hidden attribute node associated with it.

In Step 604, the application determines the affinity coefficient between the user and the instance. This is performed through natural-language processing as described above. A crowd-sourced dictionary may be used to determine the relative affinity between the user and the object. In particular embodiments, the natural-language processing accesses synonyms in the dictionary to determine the affinity coefficient.

At Step 605, the application stores the affinity score in a profile database. In particular embodiments, the coefficient is stored as an affinity edge connecting a user edge and the instance. The instance is represented by either a live concept node with a hub page, or a hidden attribute node as described above. The affinity edge may be leveraged to infer characteristics about the user. For example, in one embodiment, the edge connecting the instance and the user may create a weaker affinity edge between the user and the broader concept determined in Step 603. For example, a user expressing an affinity for the instance, "Mexican Martinis at Trudy's Mexican Grill" as in FIG. 4A would likely also have a strong interest or affinity for concept nodes representing "Mexican Martinis", "Martinis", and moderate affinities for "tequila" or "alcoholic drinks." The social network may infer these affinities and adjust them as they are reinforced or reduced. Additionally, in particular embodiments, this affinity may be used to weight other instances as suggestions for the user. For example, if another instance exists in the social graph as a node representing "Mexican Martinis at Los Charos Restaurant", the social network may push the instance as a suggestion to the user. The probability that the user will like a given suggested instance may be represented by an inferred affinity edge connecting the user node and the instance. In particular embodiments, other factors may influence the strength or weight of the inferred affinity. For example, if the instance is in the same geographic location as the user, the weight is increased. In particular embodiments, if more of the user's friends have affinity edges to the suggested instance, the weight is increased. This disclosure contemplates any manner of weighting the inferred instance based on social networking factors.

In particular embodiments, the social networking system monitors instances (represented by hidden attribute or object nodes) for the number of users with affinities towards the instance, as well as the average affinity coefficient for the node. In particular embodiments, when a particular hidden attribute node exceeds a threshold number of users expressing an affinity toward it, it may "go live" with its own hub page. In particular embodiments, the social networking system queries the owner or administrator of the concept node linked to the instance, in the aforementioned example, "Trudy's Mexican Grill", as to whether it would like a hub page created for the instance.

Once a database of instances and affinity scores is generated and stored, the social networking system may begin to leverage the database to enhance the user experience. For example, in particular embodiments, one or more applications monitors free-form text inputs to push suggestions to the user. For example, the user may post a status message with a question, "who serves the best martinis?" The social networking system may parse the status message in the same fashion to determine a broad concept of the interrogatory, in this case, "martinis", and push instances that have a high number of users expressing an affinity towards the instance. In this example, the user issuing the interrogatory may be presented with a suggestion "try the Mexican Martinis at Trudy's Mexican Grill." In particular embodiments, the social networking system constantly parses the text of users messages or instant messages, and pushes suggested instances to the users based on detected concepts. For example, the user may instant message one of his or her friends on the social network asking, "what is a good place for martinis?", and the social network 20 will automatically push the suggestion "try the Mexican Martinis at Trudy's" in an unobtrusive fashion.

In particular embodiments, the hidden attribute node may also store affinity declarations with the node. For example, if the location determined in status message 407 ("7th and Broadway") experiences a high number of affinity declarations toward it using the term "romantic" or its synonyms, the term may be used to identify users to whom the node should be suggested. For example, if a users posts the status message, "does anyone know a romantic place to take the girlfriend?" or posits the interrogatory in a private instant message, the social networking system, through natural language programming, may identify the term "romantic" (or other synonyms), and based on this determination, push the location "7th and Broadway" as a suggestion to the user. In particular embodiments, suggestions only occur after the node has a live hub page. In particular embodiments, the social networking system may push a suggestion in the form of text, even when the node does not have a visible hub page.

In particular embodiments, the social networking system may push a suggested instance to users who have expressed an explicit affinity to a concept. For example, if a user "likes" a hub page for "Martinis" or "Trudy's Mexican Grill", the social networking system may display a dialogue box to the user, for example, stating, "have you tried the Mexican Martinis at Trudy's Mexican Grill?" In other embodiments, the social networking system pushes suggested instances to the friends of users who have an affinity toward the instance. This disclosure is not limited to the described embodiments, but contemplates any method of targeting pushed suggestions on a social network.

The method of FIG. 6 may be applied to any existing node or object. For example, if there is already an existing hub page for a particular dish at a restaurant ("Foie Gras at Restaurant X"), and the program detects an affinity by a user toward that instance, there is no need to create another node for "the Foie Gras at Restaurant X." The user's affinity coefficient for the existing node will be stored as an edge to the node.

In particular embodiments, the method of FIG. 6 is applied to every single user action on the social network. In particular embodiments, context data may be inferred by the social network. In FIG. 4A, a user comments on check-in 400, stating, "Their quesadillas are phenomenal, too." Applying the method of FIG. 6 to comment 404, the application may identify "quesadillas" as an object, and "phenomenal" as an affinity declaration. In particular embodiments, because comment 404 was on check-in 400, the context data from check-in 400 is inferred to comment 400. Therefore, the social network may determine comment 400 has an instance "Quesadillas at Trudy's Mexican Restaurant." In particular embodiments, the degree to which context information is inferred decreases down the comment chain. For example, the first comment is much more likely to be related to the location checked-into than the fifteenth comment.

In particular embodiments, comments may include positive or negative affinity declarations irrespective of the action that is being commented on. For example, in FIG. 4C, free-form text declaration 411 includes negative affinity terms, but comment 413 includes one positive affinity term ("valid").

Figure 7:
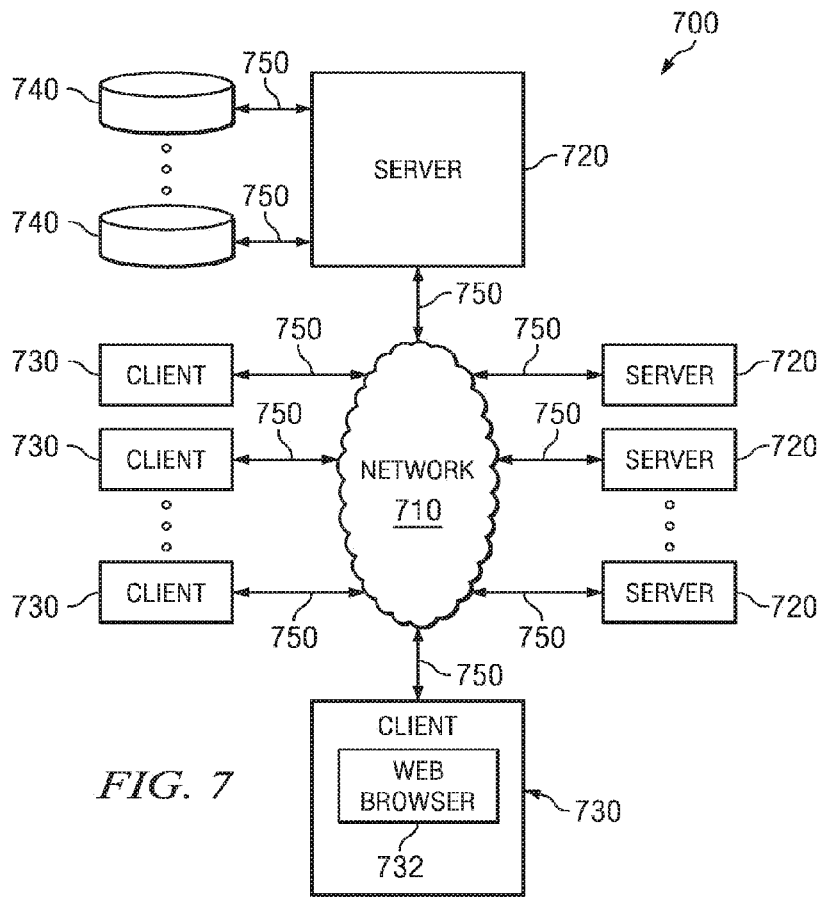
FIG. 7 illustrates an example network environment.

While the foregoing embodiments may be implemented in a variety of network configurations, the following illustrates an example network environment for didactic, and not limiting, purposes. FIG. 7 illustrates an example network environment 700. Network environment 700 includes a network 710 coupling one or more servers 720 and one or more clients 730 to each other. Network environment 700 also includes one or more data storage 740 linked to one or more servers 720. Particular embodiments may be implemented in network environment 700. For example, social networking system frontend 120 may be written in software programs hosted by one or more servers 720. For example, event database 102 may be stored in one or more storage 740. In particular embodiments, network 710 is an intranet, an extranet, a virtual private network (VPN), a local area network (LAN), a wireless LAN (WLAN), a wide area network (WAN), a metropolitan area network (MAN), a portion of the Internet, or another network 710 or a combination of two or more such networks 710. The present disclosure contemplates any suitable network 710.

One or more links 750 couple a server 720 or a client 730 to network 710. In particular embodiments, one or more links 750 each includes one or more wired, wireless, or optical links 750. In particular embodiments, one or more links 750 each includes an intranet, an extranet, a VPN, a LAN, a WLAN, a WAN, a MAN, a portion of the Internet, or another link 750 or a combination of two or more such links 750. The present disclosure contemplates any suitable links 750 coupling servers 720 and clients 730 to network 710.

In particular embodiments, each server 720 may be a unitary server or may be a distributed server spanning multiple computers or multiple datacenters. Servers 720 may be of various types, such as, for example and without limitation, web server, news server, mail server, message server, advertising server, file server, application server, exchange server, database server, or proxy server. In particular embodiments, each server 720 may include hardware, software, or embedded logic components or a combination of two or more such components for carrying out the appropriate functionalities implemented or supported by server 720. For example, a web server is generally capable of hosting websites containing web pages or particular elements of web pages. More specifically, a web server may host HTML files or other file types, or may dynamically create or constitute files upon a request, and communicate them to clients 730 in response to HTTP or other requests from clients 730. A mail server is generally capable of providing electronic mail services to various clients 730. A database server is generally capable of providing an interface for managing data stored in one or more data stores.

In particular embodiments, one or more data storages 740 may be communicatively linked to one or more servers 720 via one or more links 750. In particular embodiments, data storages 740 may be used to store various types of information. In particular embodiments, the information stored in data storages 740 may be organized according to specific data structures. In particular embodiment, each data storage 740 may be a relational database. Particular embodiments may provide interfaces that enable servers 720 or clients 730 to manage, e.g., retrieve, modify, add, or delete, the information stored in data storage 740.

In particular embodiments, each client 730 may be an electronic device including hardware, software, or embedded logic components or a combination of two or more such components and capable of carrying out the appropriate functions implemented or supported by client 730. For example and without limitation, a client 730 may be a desktop computer system, a notebook computer system, a netbook computer system, a handheld electronic device, or a mobile telephone. The present disclosure contemplates any suitable clients 730. A client 730 may enable a network user at client 730 to access network 730. A client 730 may enable its user to communicate with other users at other clients 730.

A client 730 may have a web browser 732, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 730 may enter a Uniform Resource Locator (URL) or other address directing the web browser 732 to a server 720, and the web browser 732 may generate a Hyper Text Transfer Protocol (HTTP) request and communicate the HTTP request to server 720. Server 720 may accept the HTTP request and communicate to client 730 one or more Hyper Text Markup Language (HTML) files responsive to the HTTP request. Client 730 may render a web page based on the HTML files from server 720 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 8:
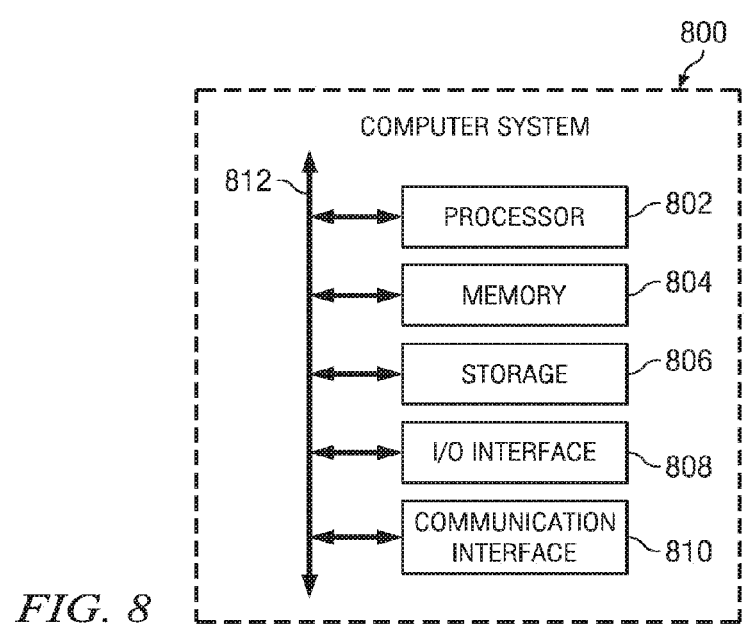
FIG. 8 illustrates an example computer system architecture.

FIG. 8 illustrates an example computing system architecture, which may be used to implement a server 22a, 22b. In one embodiment, hardware system 800 comprises a processor 802, a cache memory 804, and one or more executable modules and drivers, stored on a tangible computer readable medium, directed to the functions described herein. Additionally, hardware system 800 includes a high performance input/output (I/O) bus 806 and a standard I/O bus 808. A host bridge 808 couples processor 802 to high performance I/O bus 806, whereas I/O bus bridge 812 couples the two buses 806 and 808 to each other. A system memory 814 and one or more network/communication interfaces 816 couple to bus 806. Hardware system 800 may further include video memory (not shown) and a display device coupled to the video memory. Mass storage 818, and I/O ports 820 couple to bus 808. Hardware system 800 may optionally include a keyboard and pointing device, and a display device (not shown) coupled to bus 808. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 800 are described in greater detail below. In particular, network interface 816 provides communication between hardware system 800 and any of a wide range of networks, such as an Ethernet (e.g., IEEE 802.3) network, a backplane, etc. Mass storage 818 provides permanent storage for the data and programming instructions to perform the above-described functions implemented in the servers 22a, 22b, whereas system memory 814 (e.g., DRAM) provides temporary storage for the data and programming instructions when executed by processor 802. I/O ports 620 are one or more serial and/or parallel communication ports that provide communication between additional peripheral devices, which may be coupled to hardware system 800.

Hardware system 800 may include a variety of system architectures; and various components of hardware system 800 may be rearranged. For example, cache 804 may be on-chip with processor 802. Alternatively, cache 804 and processor 802 may be packed together as a "processor module," with processor 802 being referred to as the "processor core." Furthermore, certain embodiments of the present invention may not require nor include all of the above components. For example, the peripheral devices shown coupled to standard I/O bus 808 may couple to high performance I/O bus 806. In addition, in some embodiments, only a single bus may exist, with the components of hardware system 800 being coupled to the single bus. Furthermore, hardware system 800 may include additional components, such as additional processors, storage devices, or memories.

In one implementation, the operations of the embodiments described herein are implemented as a series of executable modules run by hardware system 800, individually or collectively in a distributed computing environment. In a particular embodiment, a set of software modules and/or drivers implements a network communications protocol stack, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 802. Initially, the series of instructions may be stored on a storage device, such as mass storage 818. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 816. The instructions are copied from the storage device, such as mass storage 818, into memory 814 and then accessed and executed by processor 802.

An operating system manages and controls the operation of hardware system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the nickname generating functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. By way of example, while embodiments of the present invention have been described as operating in connection with a social networking website, the present invention can be used in connection with any communications facility that supports web applications. Furthermore, in some embodiments the term "web service" and "web-site" may be used interchangeably and additionally may refer to a custom or generalized API on a device, such as a mobile device (e.g., cellular phone, smart phone, personal GPS, personal digital assistance, personal gaming device, etc.), that makes API calls directly to a server.

What is claimed is:

1. A method comprising:

receiving, from each of a plurality of client devices that each correspond to a plurality of users of an online social network, a plurality of inputs that comprise free-form text, wherein the free-form text of each input corresponds to an object associated with the online social network;

determining, through application of natural-language processing of the free-form text, a plurality of affinity declarations associated with the object, wherein each affinity declaration is comprised in the free-form text;

determining, for each affinity declaration, an affinity coefficient between a respective user of the plurality of users and the object;

for each of the determined affinity coefficients, dynamically adjusting the determined affinity coefficient based on social-networking information of the respective user, wherein the social-networking information reinforces or reduces the determined affinity coefficient; and upon determining that the determined affinity coefficient for a threshold number of the respective users exceeds a threshold value, creating a hub page associated with the object for display on the online social network.

2. The method of claim 1, further comprising:
publishing the hub page in association with the online social network; and
sending, to each of one or more of the client devices, a recommendation to interact with the published hub page.

3. The method of claim 2, wherein the sending the recommendation is based on the affinity coefficient between the respective user and the object.

4. The method of claim 1, wherein the object is associated with a person, location, company, or organization.

5. The method of claim 1, further comprising:
accessing a social graph comprising a plurality of nodes and a plurality of edges connecting the nodes, each of the edges between two of the nodes representing a single degree of separation between them, the nodes comprising:
a plurality of user nodes that each correspond to one of the plurality of users of the online social network; and
a plurality of concept nodes that each correspond to a concept associated with the online social network.

6. The method of claim 5, wherein the creating the hub page associated with the object comprises creating a concept node corresponding to the object.

7. The method of claim 1, wherein the affinity coefficient is based on natural language processing.

8. The method of claim 1, wherein the determining an affinity coefficient between the respective user and the object comprises extracting context data from the free-form text, the context data comprising a time, a location, or an interaction with the object that is associated with the free-form text.

9. The method of claim 1, wherein the object is a first object and is a more specific instance of a second object, wherein the second object is already associated with a page displayed on the online social network.

10. One or more computer-readable non-transitory storage media embodying software that is operable when executed to:
receive, from each of a plurality of client devices that each correspond to a plurality of users of an online social network, a plurality of inputs that comprise free-form text, wherein the free-form text of each input corresponds to an object associated with the online social network;
determine, through application of natural-language processing of the free-form text, a plurality of affinity declarations associated with the object, wherein each affinity declaration is comprised in the free-form text;
determine, for each affinity declaration, an affinity coefficient between a respective user of the plurality of users and the object; and
for each of the determined affinity coefficients dynamically adjust the determined affinity coefficient based on social-networking information of the respective user wherein the social-networking information reinforces or reduces the determined affinity coefficient; and
upon determining that the determined affinity coefficient for a threshold number of the respective users exceeds a threshold value, create a hub page associated with the object for display on the online social network.

11. The media of claim 10, wherein the software is further operable when executed to:
publish the hub page in association with the online social network; and
send, to each of one or more of the client devices, a recommendation to interact with the published hub page.

12. The media of claim 11, wherein the sending the recommendation is based on the affinity coefficient between the respective user and the object.

13. The media of claim 10, wherein the object is associated with a person, location, company, or organization.

14. The media of claim 10, wherein the software is further operable when executed to:
access a social graph comprising a plurality of nodes and a plurality of edges connecting the nodes, each of the edges between two of the nodes representing a single degree of separation between them, the nodes comprising:
a plurality of user nodes that each correspond to one of the plurality of users of the online social network; and
a plurality of concept nodes that each correspond to a concept associated with the online social network.

15. The media of claim 14, wherein the creating the page associated with the object comprises creating a concept node corresponding to the object.

16. The media of claim 10, wherein the affinity coefficient is based on natural language processing.

17. A system comprising: one or more processors; and a memory coupled to the processors comprising instructions executable by the processors, the processors being operable when executing the instructions to:
receive, from each of a plurality of client devices that each correspond to a plurality of users of an online social network, a plurality of inputs that comprise free-form text, wherein the free-form text of each input corresponds to an object associated with the online social network;
determine, through application of natural-language processing of the free-form text, a plurality of affinity declarations associated with the object, wherein each affinity declaration is comprised in the free-form text;
determine, for each affinity declaration, an affinity coefficient between a respective user of the plurality of users and the object; and
upon determining that the affinity coefficient for a threshold number of users exceeds a threshold value, create a page associated with the object for display on the online social network.

18. The system of claim 17, wherein the processors are further operable when executing the instructions to:
publish the page in association with the online social network; and
send, to each of one or more of the client devices, a recommendation to interact with the published page.

19. The system of claim 17, wherein the determining an affinity coefficient between the respective user and the object comprises extracting context data from the free-form text, the context data comprising a time, a location, or an interaction with the object that is associated with the free-form text.

20. The system of claim 17, wherein the object is a first object and is a more specific instance of a second object, wherein the second object is already associated with a page displayed on the online social network.

* * * * *